United States Patent [19]

Williams

[11] 4,035,921
[45] July 19, 1977

[54] LOCKABLE SPOUT CLOSURE ASSEMBLY

[75] Inventor: Merton S. Williams, Terryville, Conn.

[73] Assignee: Emhart Industries, Inc., Farmington, Conn.

[21] Appl. No.: 616,168

[22] Filed: Sept. 22, 1975

[51] Int. Cl.² .................. G01F 23/04; B65D 55/14
[52] U.S. Cl. .................. 33/126.7 R; 70/167; 70/231; 220/210; 220/306; 215/207
[58] Field of Search .......... 70/1, 14, 57, 63, 163–167, 70/171, 218, 221, 231, 58; 220/210, 306; 215/207, 360; 33/126.7 R

[56] References Cited

U.S. PATENT DOCUMENTS

| | | | |
|---|---|---|---|
| 1,580,527 | 4/1926 | Parmele | 70/231 X |
| 1,701,816 | 2/1929 | Malluk et al. | 220/210 |
| 1,786,332 | 12/1930 | Bradshaw | 70/165 |
| 1,961,106 | 5/1934 | Hurd | 70/231 |
| 2,566,816 | 9/1951 | Work | 220/210 |
| 2,644,610 | 7/1953 | Work | 220/210 |
| 3,130,571 | 4/1964 | Neumann | 70/58 |
| 3,371,418 | 3/1968 | Moeller | 220/306 X |
| 3,477,607 | 11/1969 | Fuzzell et al. | 220/210 |
| 3,540,245 | 11/1970 | Pope | 70/231 |
| 3,768,189 | 10/1973 | Goodrich | 215/207 X |

Primary Examiner—Roy D. Frazier
Assistant Examiner—William E. Lyddane
Attorney, Agent, or Firm—McCormick, Paulding & Huber

[57] ABSTRACT

A lockable dip stick assembly for an oil filling spout comprises an elastomeric stopper disposed between an outer compression cap and an inner compression plate which carries a dip stick. A stud extends coaxially through the cap and stopper and threadably engages the compression plate. A bell housing supported for rotation on the outer end of the stud contains a key operated lock cylinder which has a bolt radially movable between uncoupled and coupled positions corresponding, respectively, to locked and unlocked positions of the lock cylinder. In a coupled position the bolt is connected in driving relation to a drive cup mounted in fixed position on the outer end of the stud and enclosed within the housing. Rotation of the key to and beyond an unlocked position causes rotation of the stud relative to the compression plate.

17 Claims, 5 Drawing Figures

U.S. Patent  July 19, 1977  4,035,921
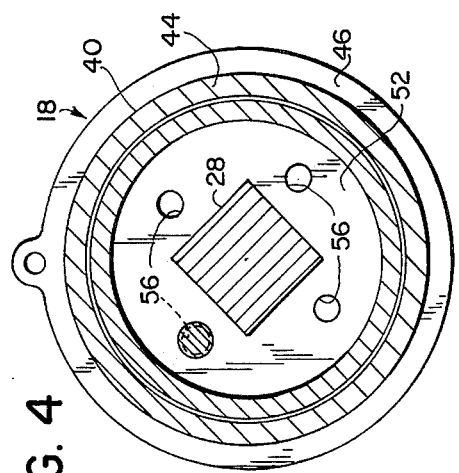
FIG. 4
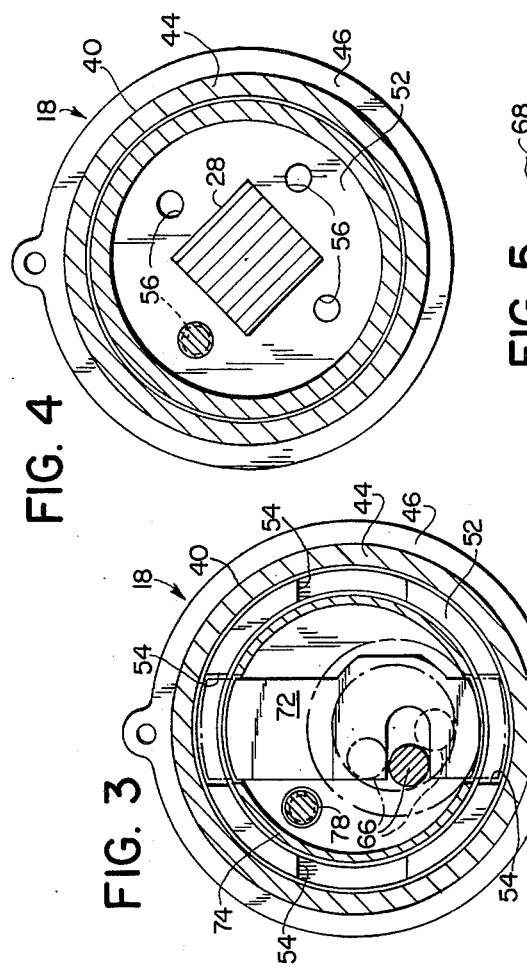
FIG. 3
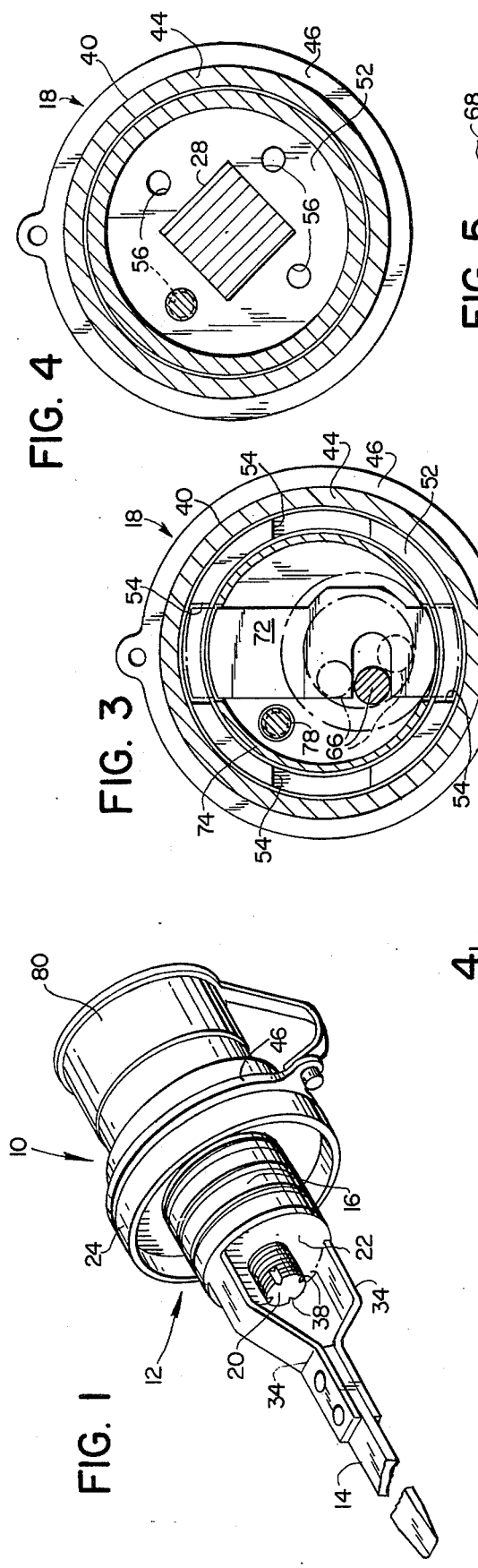
FIG. 1
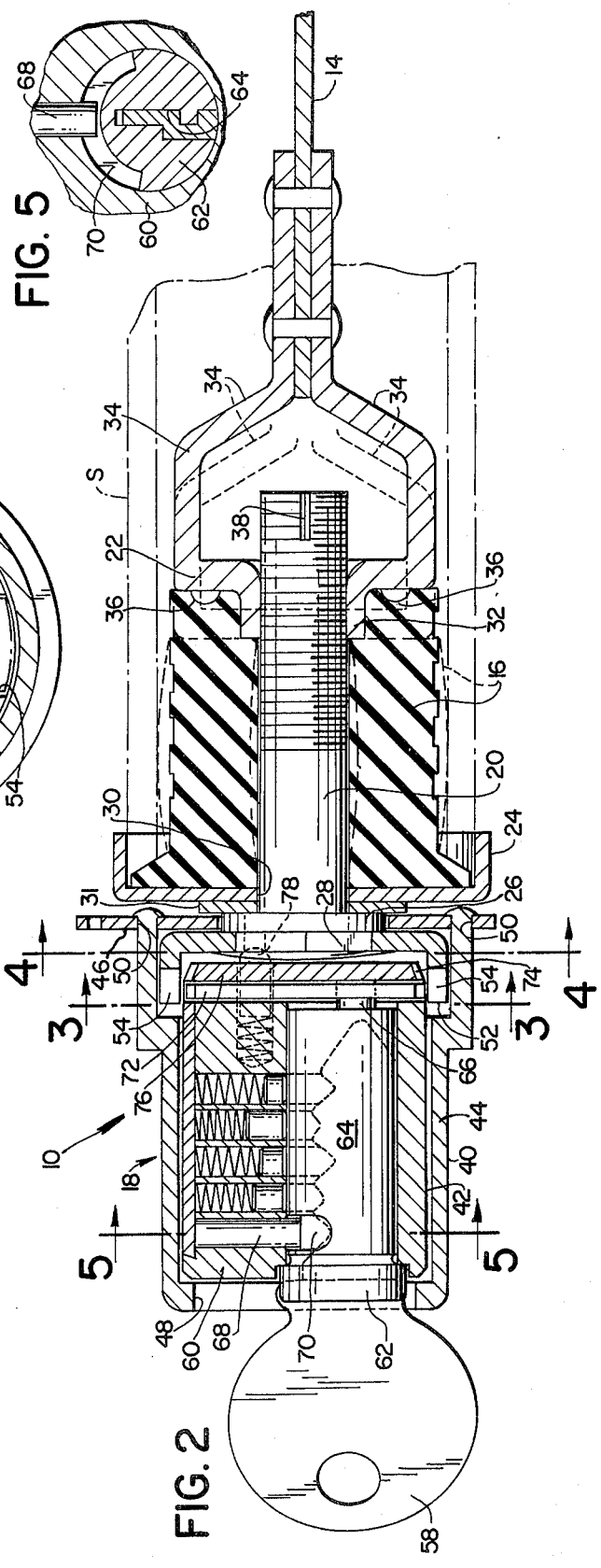
FIG. 5
FIG. 2

LOCKABLE SPOUT CLOSURE ASSEMBLY

BACKGROUND OF THE INVENTION

This invention relates in general to a lockable closure assembly for a conduit, spout or the like and deals more particularly to an improved lockable closure assembly which has an integral lock unit.

The high incidence of theft and vandalism at construction job sites has created need for improved lockable closure caps for various exposed fluid conduits or filling spouts on trucks, bulldozers, and other construction equipment to prevent fuel theft or the introduction of foreign materials into fuel tanks or oil reservoirs. Heretofore, various lockable closure caps have been devloped and used, but have not proven wholly satisfactory. If a lockable closure is secured by a separable lock, such as a padlock, the lock may be lost, misplaced or simply not used due to carelessness. To overcome this problem lockable caps have been provided which include integral lock units. However, if a cap must first be engaged with the spout and thereafter locked it may easily be left in an unlocked condition, thereby defeating its purpose.

Accordingly, it is the general aim of the present invention to provide an improved lockable lock closure assembly of a type which includes an integral key operated lock unit wherein the key must be used both to connect the closure assembly to an associated spout as well as to lock it in connected engagement with the spout.

SUMMARY OF THE INVENTION

In accordance with the present invention an improved lockable closure assembly for a conduit comprises a closure member, a stud supported on the closure member for axial rotation relative thereto, and means for connecting the closure member to the conduit in closing relation thereto in response to axial rotation of the stud relative to the closure member. A lock assembly including a lock housing is supported on the outer end of the stud for coaxial rotation relative to the stud and the closure member. A key operated lock unit wholly contained in the housing is operable to connect a coupling member associated with the lock unit and enclosed within the housing to a drive member mounted in fixed position on the inner end of the stud and also enclosed within the housing. The closure assembly is connected to and locked in engagement with the conduit in response to rotation of the key from a locked position to and beyond an unlocked position, after which the key may be returned to its locked position and removed from the lock leaving the closure assembly in connected and locked relation with the conduit.

BRIEF DESCRIPTION OF THE DRAWING

FIG. 1 is a perspective view of a lockable dip stick assembly for an oil filling spout and embodying the present invention.

FIG. 2 is a somewhat enlarged axial sectional view through the dip stick assembly of FIG. 1 shown positioned in an oil filling spout, the spout being indicated by broken lines.

FIG. 3 is a sectional view taken along the line 2—3 of FIG. 2.

FIG. 4 is a sectional view taken along the line 4—4 of FIG. 2.

FIG. 5 is a fragmentary sectional view taken along the line 5—5 of FIG. 2.

DESCRIPTION OF PREFERRED EMBODIMENT

Referring now to the drawing, a lockable dip stick assembly for an oil filling spout and embodying the present invention is indicated generally by the reference numeral 10. The dip stick assembly 10 generally comprises a lockable closure assembly indicated generally at 12 which carries a dip stick 14 and includes resilient closure member or stopper 16 and a key operated lock assembly indicated generally at 18 operable to connect and lock the stopper in closing relation to a conduit or oil filling spout such as indicated by broken lines at S in FIG. 2.

Considering the dip stick assembly 10 in further detail, the stopper 16 made from elastomeric material and adapted to be slidably received within the spout S. It is preferably molded from a "Hycar" rubber compound and has a generally cylindrical form. A plurality of annular sealing ribs are formed on the peripheral surface of the stopper for sealing engagement with the smooth inner wall of the spout S. An annular flange at the outer end of the stopper 16 engages the outer end of the spout S when the stopper is positioned in the spout. A threaded stud 20 extends coaxially through the stopper 16 and cooperates with compression member 22 and 24 at opposite ends of the stopper to axially compress the elastomeric stopper and thereby radially expand it to its broken line or closing position of FIG. 2 when the stud 20 is rotated in one direction relative to at least one of the compression members. At its outer end, the stud 20 has an enlarged head which includes a cylindrical portion 26 and a non-circular portion 28. Preferably, and as shown, the non-circular portion 28 has a generally square cross section, as best shown in FIG. 4.

The outer compression member 24 comprises a generally cylindrical cup-shaped cap which has a circular central opening 30 through which the stud 20 extends. The peripheral portion of the cup-shaped cap 24 closely surrounds the outer end of the spout S and provides a protective cover for the stopper 16 when it is positioned within the spout. A washer 31 is positioned on the stud 20 between the cylindrical portion 26 and the cap 24. The inner compression member 22 comprises a generally circular plate which bears against the inner end of the stopper 16. A sleeve 32 struck from the central portion of the plate 22 is internally threaded and forms a nut which treadably engages the inner end of the stud 20. Diametrically opposed integral legs 34, 34, extend inwardly from the plate 22 and have inner end portions bent toward each other to engage opposite sides of the dip stick 14 which is received therebetween and riveted, spot welded or otherwise secured to the inner ends of the legs 34, 34. Indentations in the inner compression plate 22, such as indicated at 36, 36, firmly embedded in the stopper 16 prevent rotation of the inner compression plate 22 relative to the stopper. At its inner end, the stud 20 is crimped or otherwise mutilated, as indicated at 38, 38, to prevent separation of the inner compression plate 32 from the stud 20. A compressible and expandable stopper and dip stick assembly such as hereinbefore described is illustrated and described in U.S. Pat. No. 3,371,418 to Moeller, issued March 5, 1968 and assigned to Moller Manufacturing Co., Inc., Greenville, Miss.

The lock assembly is mounted on the outer end of the stud 20 and includes a hollow generally cylindrical bell housing 40 containing a key operated lock unit 42 and associated coupling mechanism for operaby connecting the lock unit to the rotatable stud 20. The bell housing is made from two parts and includes a hollow generally cylindrical body 44 and a generally circular retention plate 46. The retention plate is journalled for rotation on the outer end of the stud 20 and has a circular central opening which receives the circular portion 26, the diameter of the opening being slightly greater than the diameter of the stud portion 26. The housing body 44 has a diametrically enlarged inner end portion and a circular aperture 48 in its outer end. A circumaxially spaced series of lugs project from the inner end of the housing body 44 through complementary slots 50, 50 in the retention plate 46 and are peened to retain the housing body in assembly with the retention plate, as best shown in FIG. 2.

Driving connection between the lock unit 42 and the stud 20 is provided by a cylindrical cup-shaped drive member or driving cup 52 enclosed within the inner end of the bell housing and connected in fixed position to the outer end of the stud 20. The drive cup also serves to retain the bell housing 40 in assembly with the stud 20 and has a non-circular central opening which receives and substantially complements the non-circular portion 28 of the stud. The outer end of the stud is headed or peened to retain the drive cup 52 in nonrotatable relation thereon. The drive cup 52 has a peripheral wall wherein there is formed at least one locking opening, but preferably and as shown a circumaxial series of locking openings or notches 54, 54 are formed in the peripheral wall of the drive cup 52, as best shown in FIG. 3. Outwardly opening detent recesses 56, 56 equal in number and angular spacing to the notches 54, 54, are formed in the bottom wall of the drive cup 52, as best shown in FIG. 4, for a purpose to be hereinafter discussed.

The type of lock unit used in practicing the invention may vary, but preferably, and as shown, a pin tumbler type lock cylinder is utilized. The illustrated lock unit 42 is operated by a key, such as indicated at 58, and has a body or cylindrical shell 60 supported in the bell housing 40 and at all free to rotate relative to the bell housing. A key plug 62 supported for limited rotation in the shell 60 has a keyway 64 which extends in a direction generally parallel to the axis of the stud 20 and is exposed in the aperture 48. The outer end of the key plug extends outwardly beyond the shell and has a diametrically extending slot formed therein in alignment with the keyway 64 to receive the inner end of the key bow. An eccentric drive pin 66 projects from the key plug at its inner end. A plurality of pin tumbler assemblies disposed in bores defined by the shell and the key plug cooperate with the key 58 in a conventional manner, as is well known in the art. The key plug is retained in assembly with the shell for limited rotation in either direction relative to the shell from a locked or key shed position to unlocked positions by a plug retaining pin 68 which is carried by the shell and which extends into a segmental groove 70 formed in the plug, as shown in FIGS. 2 and 5.

Coupled connection between the lock unit 42 and the drive cup 52 is established by a coupling member or bolt 72 which is carried by and comprises a part of the lock unit. The bolt 72 is received and retained in a circular bolt recess in the inner end of the shell 60 partially defined by a preipheral wall 74 and extends diametrically of the shell. The opposite ends of the bolt 72 are respectively received in slots which open through the peripheral wall 74. A backplate 76 received in the inner end of the recess generally overlies the bolt and is retained in the bolt recess by the radially inwardly rolled edge of the peripheral wall 74. The bolt is slotted to receive the drive pin 66 on the key plug substantially as shown in FIG. 3.

The dip stick assembly 10 further includes a detent mechanism for releasably retaining the lock unit in a predetermined angular position relative to the drive cup 52 wherein at least one end of the bolt is radially aligned with an associated coupling opening 54 in the drive cup. The detent mechanism comprises a detent pin 78 received in a blind bore in the shell 60 and urged in the direction of the drive cup 52 by an associated spring as best shown in FIG. 2. The detent pin 78 cooperates with the detent recesses 56, 56 to releasably retain the lock unit in one of four predetermined angular positions relative to the drive cup.

To connect and lock the dip stick assembly 10 to a spout, such as the spout S, the stopper 16 is inserted into the spout and a proper key, such as the key 58, is inserted into the keyway 64 and rotated in a clockwise direction. The lock unit 42 is free to rotate relative to the bell housing 40 and the drive cup 52 until the detent pin 78 engages an associated detent recess. Further clockwise rotation of the key causes the key plug 62 to rotate to an unlocked position relative to the shell 60 and also causes the bolt 72 to move radially outwardly to a coupled position wherein an end of the bolt is disposed in an associated coupling opening 54 in the drive cup 52. When the bolt attains a fully projected position in coupled engagement with the drive cup the plug retaining pin engages an asociated end of the segmental groove 70 to limit further clockwise rotation of the plug 62 relative to the shell 60. Thereafter further clockwise rotation of the key 58 transmits torque through the key plug 62, the shell 60 and the bolt 72 to the drive cup 52 which causes the stud 20 to be threaded into the inner compression plate 22 to axially compress and radially expand the stopper 16 from its full to its broken line position of FIG. 2. The key may then be turned in a counterclockwise direction to its locked or shed position and withdrawn from the lock unit. In the locked position the bell housing 40 and the lock unit 42 are generally free to rotate relative to each other and to drive cup 52 which is wholly enclosed within the bell housing.

The dip stick assembly may be removed from the spout S by inserting a proper key into the lock cylinder 42 and rotating it in a counterclockwise direction which causes the opposite end of the bolt 72 to establish coupling engagement with the drive cup 52. Thereafter further rotation of the key in a counterclockwise direction causes rotation of the stud 20 to release compressive force acting upon the stopper 16 whereby the dip stick assembly may be removed from the spout S.

Optionally, the closure assembly may be provided with a dust cap or cover 80, shown in FIG. 1, which may be positioned on the housing 40 when the key is removed from the lock unit to prevent dust and dirt from entering the key slot to impair the function of the lock.

I claim:

1. A lockable closure assembly for a spout comprising a closure member, a stud supported on said closure member for axial rotation relative thereto, means for connecting said closure member to said spout in closing relation thereto in response to axial rotation of said stud relative to said closure member, and a lock assembly including a lock housing supported at its inner end on the outer end portion of said stud for coaxial rotation relative to said stud and said closure member, said housing having an aperture in its outer end, a drive member enclosed within the inner end portion of said housing and mounted in fixed position on said stud outer end portion for rotation with said stud, a key operated lock unit wholly encased within said housing inwardly of said outer end of said housing and including a body and a key plug supported for rotation in said body, said key plug having a keyway extending in a direction generally parallel to the axis of said stud and opening outwardly through the outer end of said key plug and exposed in said aperture, said key plug being rotatable between locked and unlocked positions relative to said body in response to insertion of a proper key into said keyway and rotation of proper key relative to said body, a coupling member enclosed within the inner end portion of said housing, and means for moving said coupling member radially between uncoupled and coupled positions respectively corresponding to locked and unlocked positions of said lock unit in response to rotation of said key plug, said coupling member in a coupled position connecting said drive member to said lock unit for rotation with said lock unit and relative to said closure member in response to rotation of key, said lock unit being free to rotate within said housing and relative to said drive member when said coupling member is in an uncoupled position, said housing being at all times free to rotate about its axis and relative to said stud and said lock unit.

2. A lockable closure assembly for a spout as set forth in claim 1 wherein said coupling member comprises a part of said lock unit.

3. A lockable closure assembly for a spout as set forth in claim 2 wherein said coupling member comprises a bolt supported on said body and radially movable between said coupled and uncoupled positions.

4. A lockable closure assembly for a spout as set forth in claim 3 wherein said drive member comprises a generally cylindrical cup shaped part coaxially mounted on said stud and having at least one locking opening in its peripheral wall receiving one end portion of said bolt therein when said bolt is in a coupled position.

5. A lockable closure assembly for a spout as set forth in claim 3 wherein said means for moving said bolt comprises a cam on said key plug engaging said bolt.

6. A lockable closure assembly for a spout as set forth in claim 5 wherein said cam comprises an eccentric pin on said key plug received in a slot in said bolt.

7. A lockable closure assembly for a spout as set forth in claim 1 wherein said housing comprises a generally cylindrical bell housing having its inner end coaxially journalled on said one end portion and said aperture formed in its outer end and said lock unit comprises a lock cylinder supported in said housing for coaxial rotation therein.

8. A lockable closure assembly for a spout as set forth in claim 7 wherein said coupling member comprises a bolt supported on the inner end of said lock cylinder and radially movable between said coupled and uncoupled positions.

9. A lockable closure assembly for a spout as set forth in claim 1 wherein said coupling member is engagable with said drive member in at least one coupling position corresponding to a predetermined angular position of said lock unit relative to said drive unit and said closure assembly includes detent means for releasably retaining said lock unit in said predetermined angular position when said lock unit is rotated to said predetermined angular position.

10. A lockable closure assembly for a spout as set forth in claim 9 wherein said detent means comprises a detent member carried by said lock unit, means for biasing said detent member toward said drive member and a detent recess is said drive member for receiving a portion of said detent member when said lock unit is in said predetermined angular position.

11. A lockable closure assembly for a spout as set forth in claim 1 wherein said closure member comprises a generally cylindrical elastomeric stopper adapted to be received within said spout, said stud extends coaxially through said stopper, and said connecting means comprises an outer compression member received on said outer end portion of said stud for between said stopper and said lock housing and bearing against the outer end of said stopper, an inner compression member threaded onto the inner end of said stud and bearing against the inner end of said stopper, and means for restraining said inner compression member against rotation relative to said stopper in response to rotation of said stud relative to said stopper and said inner compression member.

12. A lockable closure assembly as set forth in claim 11 including an axially elongated dip stick mounted on the inner end of said closure assembly.

13. A lockable closure assembly as set forth in claim 12 wherein said dip stick is mounted on said inner compression member.

14. A lockable closure assembly for a spout as set forth in claim 1 including stop means for limiting rotation of said key plug in either direction from a locked position to an unlocked position.

15. A lockable closure assembly for a spout comprising a closure member, an axially elongated stud supported on said closure member for axial rotation relative thereto, means connecting said closure member to said spout in closing relation thereto in response to axial rotation of said stud relative to said closure member, and a lock assembly including a generally cylindrical bell housing having its inner end journalled on the outer end portion of said stud for coaxial rotation relative to said stud and said closure member and having an aperture in its outer end, a generally cylindrical drive cup enclosed within said housing and coaxailly mounted in fixed position on said outer end portion of said stud for rotation with said stud, said drive cup having at least one coupling notch in its peripheral wall, and a key operated lock cylinder wholly encased in said bell housing and including a cylindrical shell, a key plug supported for rotation in said shell and having a generally axially extending keyway opening through the outer end of said plug and exposed in said aperture, said key plug being rotatable between locked and unlocked positions relative to said shell in response to insertion of a proper key into said keyway and rotation of said proper key in either direction from an unlocked position relative to said shell, a coupling bolt supported on said shell and movable relative thereto between uncoupled and coupled positions respectively corresponding to locked and unlocked positions of said lock cylinder, and means for moving said coupling bolt between its uncoupled and coupled positions, respectively, in response to rotation of said key plug between its locked and unlocked positions, said coupling bolt in its uncoupled position being out of connected engagement with said drive cup and rotatable with said lock cylinder and relative to said drive cup, said coupling bolt in its coupled position having an end portion thereof disposed in said coupling notch and connecting said drive cup to said lock cylinder for coaxial rotation with said lock cylinder in response to rotation of the proper key in either direction from a locked position to and beyond an unlocked position, said housing being at all times free to rotate about its-axis and relative to said stud and said lock cylinder.

16. A lockable closure assembly for a spout as set forth in claim 15 wherein said closure member comprises a generally cylindrical elastomeric stopper having an outside diameter slightly smaller than the inside diameter of the spout, said stud extends coaxially through said stopper, and said connecting means comprises a generally cylindrical inwardly opening cup-shaped cap coaxially received on said outer end portion of said stud between said stopper and said lock housing and bearing against the outer end of said stopper, an inner compression plate threaded onto the inner end of said stud and bearing against the inner end of said stopper, and means for restraining said inner compression plate against rotation relative to said stopper in response to rotation of said stud relative to said stopper and said inner compression plate.

17. A lockable closure assembly as set forth in claim 16 including an axially elongated dip stick mounted on the inner end of said compression plate.

* * * * *

UNITED STATES PATENT OFFICE
CERTIFICATE OF CORRECTION

Patent No. 4,035,921           Dated July 19, 1977

Inventor(s) Merton S. Williams

It is certified that error appears in the above-identified patent and that said Letters Patent are hereby corrected as shown below:

Col. 1, line 65, after "line", "2-3" should be --3-3--.

Col. 2, line 27, after "compression", "member" should be --members--.

Col. 2, line 49, after "which", "treadably" should be --threadably--.

Col. 5, line 18, after "rotation of" insert --said--.

Col. 5, line 27, after "rotation of" insert --the--.

Col. 6, line 9, after "recess", "is" should be --in--.

Signed and Sealed this

Twenty-seventh Day of September 1977

[SEAL]

*Attest:*

RUTH C. MASON          LUTRELLE F. PARKER
*Attesting Officer*     *Acting Commissioner of Patents and Trademarks*